US009706461B2

(12) United States Patent
Wu et al.

(10) Patent No.: US 9,706,461 B2
(45) Date of Patent: Jul. 11, 2017

(54) METHOD OF HANDOVER IN DEVICE TO DEVICE COMMUNICATION, BASE STATION AND COMMUNICATION SYSTEM

(71) Applicant: FUJITSU LIMITED, Kawasaki-shi, Kanagawa (JP)

(72) Inventors: Lianhai Wu, Beijing (CN); Ningjuan Chang, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/697,004

(22) Filed: Apr. 27, 2015

(65) Prior Publication Data

US 2015/0230144 A1 Aug. 13, 2015

Related U.S. Application Data

(63) Continuation of application No. PCT/CN2012/084354, filed on Nov. 9, 2012.

(51) Int. Cl.
*H04W 4/00* (2009.01)
*H04W 36/14* (2009.01)
(Continued)

(52) U.S. Cl.
CPC .......... *H04W 36/14* (2013.01); *H04W 4/005* (2013.01); *H04W 36/08* (2013.01); *H04W 76/043* (2013.01)

(58) Field of Classification Search
CPC .......... H04L 2012/5608; H04W 84/12; H04W 88/08; H04W 80/04; H04W 84/18; H04W 88/06; H04W 74/08

(Continued)

(56) References Cited

U.S. PATENT DOCUMENTS

2013/0102314 A1* 4/2013 Koskela ............ H04W 36/0072
455/436
2013/0308598 A1* 11/2013 Madan .................. H04W 36/18
370/331

FOREIGN PATENT DOCUMENTS

CN 102469082 A 5/2012
CN 102598790 A 7/2012
(Continued)

OTHER PUBLICATIONS

International Search Report issued for corresponding International Patent Application No. PCT/CN2012/084354, mailed Aug. 8, 2013, with an English translation.

(Continued)

*Primary Examiner* — Brenda H Pham
(74) *Attorney, Agent, or Firm* — Myers Wolin, LLC

(57) ABSTRACT

Embodiments of the present application provide a method of handover in device to device communication, a base station and a communication system. The method of handover includes: transmitting, by a source base station, a handover request for handing over UE, the handover request comprising information indicating the UE to perform D2D communication with paired UE; receiving a response of the handover request transmitted by one or more base stations, and selecting one of the base stations as a target base station; and handing over the UE to the target base station according to the response of the handover request transmitted the target base station. With the embodiments of the present application, the UE and the paired UE may be made to proceed with performing D2D communication in the target base station, thereby further saving signaling overhead, and reducing waste of resources.

9 Claims, 7 Drawing Sheets

(51) Int. Cl.
*H04W 36/08* (2009.01)
*H04W 76/04* (2009.01)

(58) Field of Classification Search
USPC ............. 370/310.2, 328, 338, 349, 331
See application file for complete search history.

(56) References Cited

FOREIGN PATENT DOCUMENTS

| | | |
|---|---|---|
| JP | 2012-514405 A | 6/2012 |
| JP | 2015-526982 A | 9/2015 |
| WO | 2010/076124 A1 | 7/2010 |
| WO | 2011/082522 A1 | 7/2011 |
| WO | 2011/109027 A1 | 9/2011 |
| WO | 2012/062164 A1 | 5/2012 |
| WO | 2014/014326 A1 | 1/2014 |

OTHER PUBLICATIONS

Notice of preliminary rejection issued for corresponding Korean Patent Application No. 10-2015-7012021 mailed on Mar. 18, 2016 with an English translation attached.
Extended European search report with supplementary European search report and the European search opinion issued by the European Patent Office for corresponding European Patent Application No. 12888080.4, mailed on Apr. 13, 2016.
First Office Action issued by the Japan Patent Office for corresponding Japanese Patent Application No. 2015-540983, mailed on Jul. 5, 2016, with an English translation.

* cited by examiner

METHOD OF HANDOVER IN DEVICE TO DEVICE COMMUNICATION, BASE STATION AND COMMUNICATION SYSTEM

CROSS REFERENCE TO RELATED APPLICATIONS

This application is a continuation application of International Application PCT/CN2012/084354 filed on Nov. 9, 2012, the entire contents of which are incorporated herein by reference.

TECHNICAL FIELD

The present application relates to the field of communications, and in particular to a method of handover in device to device (D2D) communication, a base station and a communication system.

BACKGROUND

D2D communication is a technology directly performing communication under the control of a base station and permitting multiplexing cell resources or D2D specific resources between terminals, which is able to increase spectral efficiency of a cellular communication system, lower transmission power of a terminal, and solve the problem that a radio communication system of lack of spectral resources to a certain extent. The D2D technology may be applied to a mobile cellular network, so as to increase a rate of resource utilization and a network capacity. Resources occupied by each D2D communication link are equal to those occupied by a cellular communication link. D2D communication may obtain frequency resources and transmission power needed in communication under the control of a base station. When it shares radio resources with a cellular network, some interference will be brought.

D2D communication may use the same resources as those used by a cellular cell, and may also use D2D specified resources. A user performing D2D communication is also under the control of a base station. A system base station controls the resources used in the D2D communication and transmission power of the D2D communication, so as to ensure that the interference brought by D2D to existing communication of a cell is in an acceptable range.

However, it was found by the inventors that it often occurs in a D2D scenario that two pieces of UE performing D2D traffic advance in the same direction at an approximate or identical speed, such as two pieces of UE in a vehicle. In such a scenario, handover occurs in UE1 and UE2 almost at the same time. According to an existing specification, as a target base station does not know that UE1 and UE2 can establish D2D communication, the target base station will establish a non-D2D communication manner respectively for UE1 and UE2, and then establish D2D communication for UE1 and UE2 by mode selection, thereby resulting in extra signaling overhead and waste of resources.

It should be noted that the above description of the background art is merely provided for clear and complete explanation of the present application and for easy understanding by those skilled in the art. And it should not be understood that the above technical solution is known to those skilled in the art as it is described in the background of the present application.

SUMMARY

Embodiments of the present application provide a method of handover in device to device communication, a base station and a communication system, with an object being to further save signaling overhead and reduce waste of resources.

According to an aspect of the embodiments of the present application, there is provided a method of handover in device to device communication, including:

transmitting, by a source base station, a handover request for handing over UE, the handover request including information indicating the UE to perform D2D communication with paired UE;

receiving a response of the handover request transmitted by one or more base stations, and selecting one of the base stations as a target base station; and configuring the UE and performing a handover procedure according to the response of the handover request including resource information of the UE and the paired UE transmitted by the target base station, such that the UE and the paired UE proceed with performing D2D communication in the target base station.

According to another aspect of the embodiments of the present application, there is provided a method of handover in device to device communication, including:

receiving, by a target base station, a handover request transmitted by a source base station, the handover request including information indicating UE to perform D2D communication with paired UE; and transmitting a response of the handover request to the source base station, the response of the handover request including resource information of the UE and the paired UE, such that the UE and the paired UE proceed with performing D2D communication in the target base station.

According to still another aspect of the embodiments of the present application, there is provided a base station, including:

a first transmitting unit configured to transmit a handover request for handing over UE, the handover request including information indicating the UE to perform D2D communication with paired UE;

a first receiving unit configured to receive a response of the handover request transmitted by one or more base stations, and select one of the base stations as a target base station; and a handover unit configured to configure the UE and perform a handover procedure according to the response of the handover request including resource information of the UE and the paired UE transmitted by the target base station, such that the UE and the paired UE proceed with performing D2D communication in the target base station.

According to still another aspect of the embodiments of the present application, there is provided a base station, including:

a second receiving unit configured to receive a handover request transmitted by a source base station, the handover request including information indicating UE to perform D2D communication with paired UE; and a second transmitting unit configured to transmit a response of the handover request to the source base station, the response of the handover request including resource information of the UE and the paired UE, such that the UE and the paired UE proceed with performing D2D communication in a target base station.

According to still another aspect of the embodiments of the present application, there is provided a communication system, including the base station as described above.

According to still another aspect of the embodiments of the present application, there is provided a computer-readable program, wherein when the program is executed in a base station, the program enables a computer to carry out the method of handover as described above in the base station.

According to still another aspect of the embodiments of the present application, there is provided a storage medium in which a computer-readable program is stored, wherein the computer-readable program enables a computer to carry out the method of handover as described above in a base station.

An advantage of the embodiments of the present application exists in that a handover request for handing over UE is transmitted by a source base station, the handover request including information indicating the UE to perform D2D communication with paired UE, the UE is handed over to a target base station according to a response of the handover request transmitted by the target base station, and the UE and paired UE are made to proceed with performing D2D communication in the target base station, thereby further saving signaling overhead, and reducing waste of resources.

With reference to the following description and drawings, the particular embodiments of the present application are disclosed in detail, and the principles of the present application and the manners of use are indicated. It should be understood that the scope of the embodiments of the present application is not limited thereto. The embodiments of the present application contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the application can be better understood with reference to the following drawings. The components in the drawings are not necessarily to scale, emphasis instead being placed upon clearly illustrating the principles of the present application. To facilitate illustrating and describing some parts of the application, corresponding portions of the drawings may be exaggerated in size.

Elements and features depicted in one drawing or embodiment of the application may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further features of the present application will be apparent with reference to the following description and attached drawings. In the description and drawings, particular embodiments of the application have been disclosed in detail as being indicative of some of the ways in which the principles of the application may be employed, but it is understood that the application is not limited correspondingly in scope. Rather, the application includes all changes, modifications and equivalents coming within the spirit and terms of the appended claims.

Figure 1:
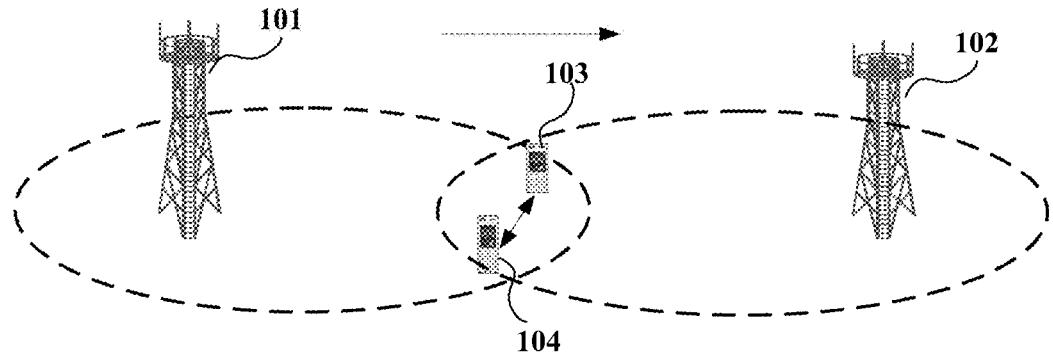
FIG. 1 is a schematic diagram of performing D2D communication between UE in a cellular network.

FIG. 1 is a schematic diagram of performing D2D communication between UE in a cellular network. As shown in FIG. 1, besides performing communication via base station services, cell users may also directly perform communication via a D2D link. As shown in FIG. 1, user equipment 103 (UE1) and paired user equipment 104 (UE2) are served by a base station 101 (eNB1), data between UE1 and UE2 need not pass through the eNB and a core network, and control signaling is still transmitted by eNB1.

According to an existing protocol, in the scenario shown in FIG. 1, when UE1 and UE2 move from eNB1 to a base station 102 (eNB2) and satisfy a handover condition, eNB1 will hand over UE1 and UE2 respectively to the eNB2. As the eNB2 does not know that UE1 and UE2 are performing communication and are in a D2D relationship, the eNB2 will establish a normal link (which refers to a manner of communication in which data transmission needs to pass an eNB and a core network) for UE1 and UE2 respectively. After a D2D discovery process of UE1 and UE2, UE1 and UE2 will report D2D related information, and the eNB2 will know that UE1 and UE2 may establish D2D communication and they are performing communication. At this moment, the eNB2 will again establish a D2D channel for UE1 and UE2 by mode selection.

If the eNB2 knows in advance that UE1 and UE2 are performing communication and have a good D2D channel, when UE1 and UE2 are handed over to the eNB2, the eNB2 may directly establish D2D communication for UE1 and UE2. Therefore, signaling overhead for establishing first a normal link and then selecting a mode may be saved.

Based on the above way of thinking, the present application shall be described below in detail taking the scenario shown in FIG. 1 as an example. It should be noted that the present application is not limited to the scenario shown in FIG. 1, and the present application may be applicable to all scenarios where two pieces of UE performing D2D are handed over from one base station to another at the same time or approximately at the same time.

Embodiment 1

Figure 2:
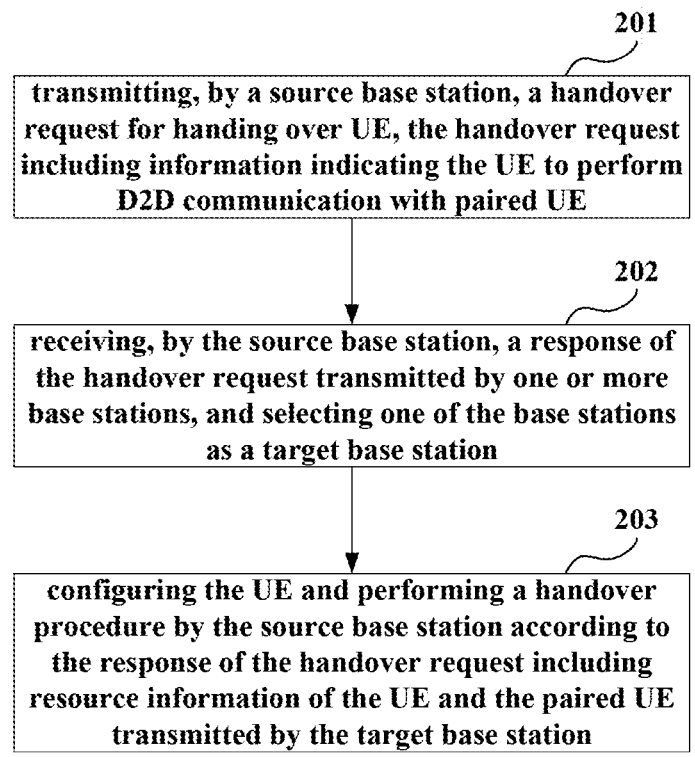
FIG. 2 is a flowchart of the method of handover of Embodiment 1 of the present application.

An embodiment of the present application provides a method of handover in D2D communication, which shall be described from a source base station side. FIG. 2 is a flowchart of the method of handover of the embodiment of the present application. As shown in FIG. 2, the method of handover includes:

step 201: transmitting, by a source base station, a handover request for handing over UE, the handover request including information indicating the UE to perform D2D communication with paired UE;

step 202: receiving, by the source base station, a response of the handover request transmitted by one or more base stations, and selecting one of the base stations as a target base station; and step 203: configuring the UE and performing a handover procedure by the source base station according to the response of the handover request including resource information of the UE and the paired UE transmitted by the target base station, such that the UE and the paired UE proceed with performing D2D communication in the target base station.

In this embodiment, the UE may be one that is performing D2D communication with the paired UE, and the number of pieces of the paired UE may be one or greater. However, the present application is not limited thereto, and the number of pieces of the paired UE may be determined according to an actual situation.

In this embodiment, for the UE and the paired UE, the source base station may transmit a handover request respectively; wherein, the handover request includes information indicating the UE to perform D2D communication with the paired UE, and the relevant art may be referred to for other information on the handover request.

In particular implementation, the information indicating the UE to perform D2D communication with paired UE may include: identifier information of the paired UE, or, information indicating whether the UE to perform D2D communication and identifier information of the paired UE.

In a mode of implementation, the handover request may include only the identifier information of the paired UE, and the identifier information of the paired UE may be unique identifier in a cell, such as a cell radio network temporary identifier (C-RNTI), or ShortMAC-I, etc. However, the present application is not limited thereto, and particular information may be determined according to an actual situation.

In particular implementation, the information indicating the UE to perform D2D communication with paired UE may further include: information on whether one or more E-RAB(s) of the UE perform(s) D2D communication and identifier information of the paired UE corresponding to the E-RAB(s) performing D2D communication, or, identifier information of the E-RAB(s) performing D2D communication and identifier information of the corresponding paired UE.

Wherein, the E-RAB refers to evolved UTRAN radio access bearer, the UTRAN being UTMS terrestrial radio access network, the UTMS being universal mobile telecommunications system. And the relevant art may be referred to for details.

In a mode of implementation, information on whether each E-RAB of the UE performs D2D and the identifier information of the paired UE corresponding to the E-RAB performing D2D communication may be added into the handover request.

For example, UE1 includes E-RABs numbered 0-3, in which E-RABs numbered 1 and 2 are performing D2D communication with UE2 and UE3 respectively, and information shown in Table 1 may be added into the handover request.

TABLE 1

| Whether D2D communication is performed | Paired UE |
|---|---|
| 0 | 0 |
| 1 | Identifier information of UE2, such as C-RNTI, or ShortMAC-I, etc. |
| 1 | Identifier information of UE3, such as C-RNTI, or ShortMAC-I, etc. |
| 0 | 0 |

In another mode of implementation, identifier information of the E-RAB performing D2D communication of the UE and the identifier information of the corresponding paired UE may be added into the handover request.

For example, UE1 includes E-RABs numbered 0-3, in which E-RABs numbered 1 and 2 are performing D2D communication with UE2 and UE3 respectively, and information shown in Table 2 may be added into the handover request.

TABLE 2

| Serial number of E-RAB | Paired UE |
|---|---|
| 1 | Identifier information of UE2, such as C-RNTI, or ShortMAC-I, etc. |
| 2 | Identifier information of UE3, such as C-RNTI, or ShortMAC-I, etc. |

It should be noted that the information in the handover request indicating the UE to perform D2D communication with the paired UE is illustrated above only. However, the present application is not limited thereto, and a particular mode of implementation may be determined according to an actual situation.

Figure 3:
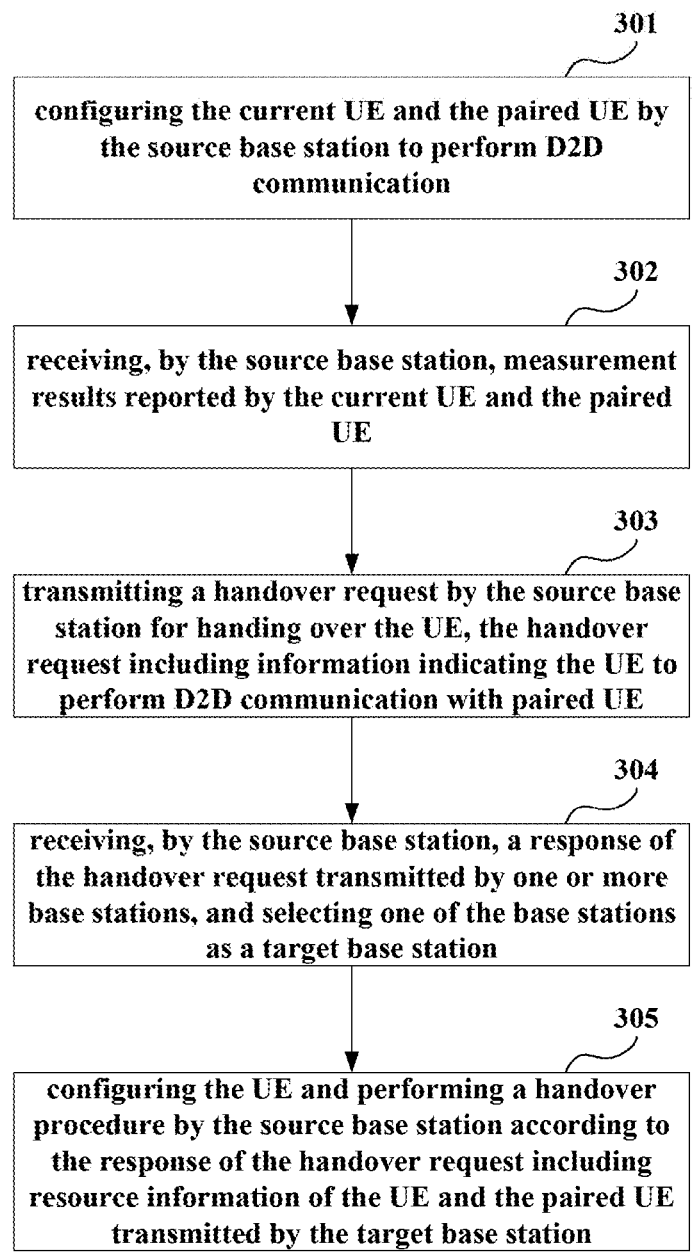
FIG. 3 is another flowchart of the method of handover of Embodiment 1 of the present application.

FIG. 3 is another flowchart of the method of handover of the embodiment of the present application. For the sake of convenience, following description is given taking a piece of paired UE in the scenario shown in FIG. 1 (that is, D2D communication is performed between two pieces of UE, in which UE1 is current UE, and UE2 is paired UE) as an example, and D2D communication between multiple pieces of UE may be realized similarly.

As shown in FIG. 3, the method of handover includes:

step 301: configuring the current UE and the paired UE by the source base station to perform D2D communication;

in this embodiment, both UE1 and UE2 are in the coverage of eNB1 and are performing communication in a D2D manner, move to the eNB2 at identical or approximate speeds;

step 302: receiving, by the source base station, measurement results reported by the current UE and the paired UE;

in this embodiment, as the movement of UE1 and UE2, a signal of a serving cell (i.e. a cell where eNB1 is present) becomes poor and poor, and a signal of a neighboring cell becomes better and better; both UE1 and UE2 will trigger report of measurement, reporting measurement results of the serving cell and the neighboring cell;

step 303: transmitting a handover request by the source base station for handing over the UE, the handover request including information indicating the UE to perform D2D communication with paired UE;

in this embodiment, eNB1 may perform judgment according to the measurement results of UE1 and UE2, and begin to transmit the handover request to a base station of the neighboring cell when it is judged that both UE1 and UE2 may be handed over to the neighboring cell. Taking handover of UE1 as an example, information indicating UE1 to perform D2D communication with UE2 may be added into the handover request, details of the information being as those described above;

furthermore, the handover request may further include information on channel quality of a D2D link between the UE and the paired UE; that is, channel quality of a D2D link between handover objects may also be transmitted to a target base station by the source base station, for reference by the target base station;

in particular implementation, the channel quality may be reference signal receiving power (RSRP), or reference signal receiving quality (RSRQ); however, the present application is not limited thereto, other information on channel quality may also be adopted, and a particular mode of implementation may be determined according to an actual situation;

step 304: receiving, by the source base station, a response of the handover request transmitted by one or more base stations, and selecting one of the base stations as a target base station;

in particular implementation, eNB1 may receive the response of the handover request (HANDOVER REQUEST ACKNOWLEDGE) transmitted by one or more eNBs, and select a suitable eNB, such as eNB2; and eNB1 may configure UE1 to perform a handover procedure;

in this embodiment, the response of the handover request includes resource information of the UE and the paired UE, and may in particular include: information on locations of time and frequency resources of a discovery signal of the UE, and information on locations of time and frequency resources of a discovery signal of the paired UE;

that is, it may include locations of time and frequency resources of a discovery signal of the UE itself, the signal being able to be used by the paired UE for detecting quality of a channel between the UE and the paired UE; and it may also include locations of time and frequency resources of a discovery signal of the paired UE still having D2D with the UE, the time and frequency resources being able to be used by the UE for detecting D2D channel quality;

in this embodiment, the response of the handover request may further include: indication on whether the UE proceeding with communication in the target base station is permitted to perform D2D communication, or indication on whether the E-RAB proceeding with communication in the target base station is permitted to perform D2D communication;

in particular implementation, for the UE permitted to proceed with communication in the target eNB, whether the UE is in a D2D communication manner needs to be indicated, or for the E-RAB permitted to proceed with communication in the target eNB, whether the E-RAB is in a D2D communication manner needs to be indicated;

step 305: configuring the UE and performing a handover procedure by the source base station according to the response of the handover request including resource information of the UE and the paired UE transmitted by the target base station, such that the UE and the paired UE proceed with performing D2D communication in the target base station;

in this embodiment, as the source base station may receive the resource information of the UE and the paired UE, it may directly configure D2D information for the UE and the paired UE; and the target base station needs not to reestablish a normal link for the UE and the paired UE, and may directly establish D2D communication for the UE and the paired UE, thereby saving signaling overhead for establishing first a normal link and then selecting a mode;

and in this embodiment, the source base station may forward data of the UE to the target base station. Only when signaling for releasing a UE context transmitted by the target base station is received, can the source base station begin to release a UE resource.

It can be seen from the above embodiment that a handover request for handing over UE is transmitted by a source base station, the handover request including information indicating the UE to perform D2D communication with paired UE, the UE is handed over to a target base station by the source base station according to a response of the handover request including resource information of the UE and the paired UE transmitted by the target base station, and the UE and paired UE are made to proceed with performing D2D communication in the target base station, thereby further saving signaling overhead, and reducing waste of resources.

Embodiment 2

An embodiment of the present application provides a method of handover in D2D communication, which shall be described from a target base station side, with contents identical to those described in Embodiment 1 being not going to be described any further.

Figure 4:
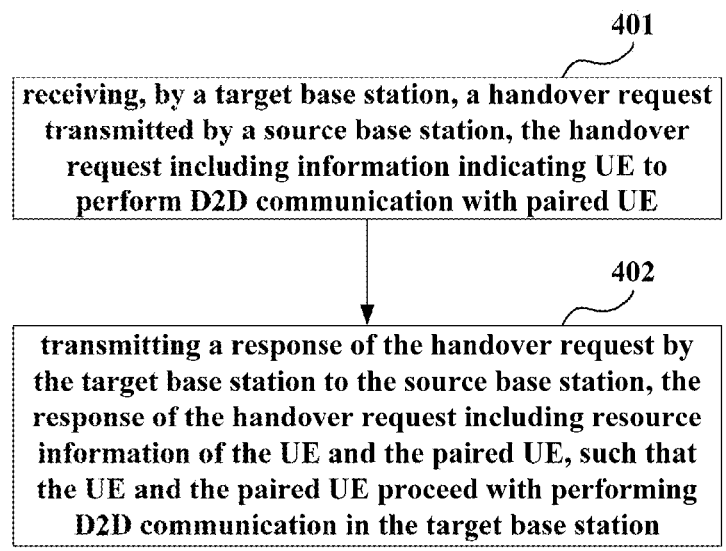
FIG. 4 is a flowchart of the method of handover of Embodiment 2 of the present application.

FIG. 4 is a flowchart of the method of handover of the embodiment of the present application. As shown in FIG. 4, the method of handover includes:

step 401: receiving, by a target base station, a handover request transmitted by a source base station, the handover request including information indicating UE to perform D2D communication with paired UE; and step 402: transmitting a response of the handover request by the target base station to the source base station, the response of the handover request including resource information of the UE and the paired UE, such that the UE and the paired UE proceed with performing D2D communication in the target base station.

Figure 5:
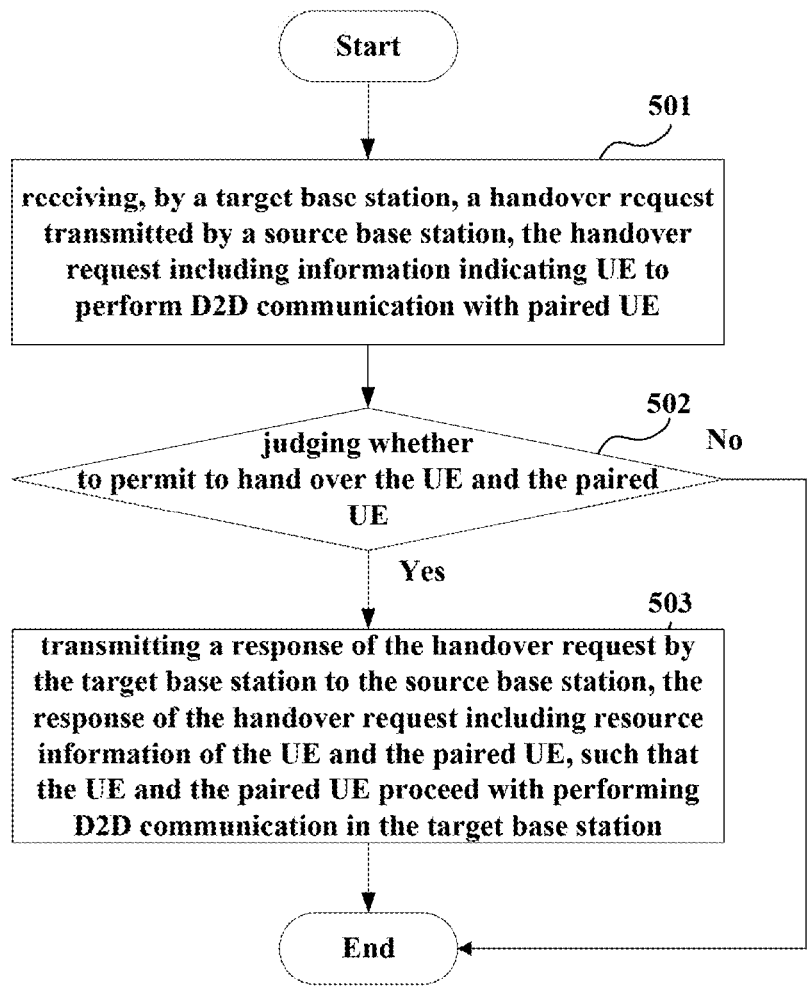
FIG. 5 is another flowchart of the method of handover of Embodiment 2 of the present application.

FIG. 5 is another flowchart of the method of handover of the embodiment of the present application. As shown in FIG. 5, the method of handover includes:

step 501: receiving, by a target base station, a handover request transmitted by a source base station, the handover request including information indicating UE to perform D2D communication with paired UE; and step 502: judging, by the target base station, whether to permit to hand over the UE and the paired UE, executing step 503 if yes, otherwise, terminating the process; and step 503: transmitting a response of the handover request by the target base station to the source base station, the response of the handover request including resource information of the UE and the paired UE, such that the UE and the paired UE proceed with performing D2D communication in the target base station.

In a mode of implementation, the information in the handover request indicating the UE to perform D2D communication with paired UE may include: identifier information of the paired UE, or, information indicating whether the UE to perform D2D communication and identifier information of the paired UE.

In another mode of implementation, the information in the handover request indicating the UE to perform D2D communication with paired UE may include: information on whether one or more E-RAB(s) of the UE perform(s) D2D communication and identifier information of the paired UE corresponding to the E-RAB(s) performing D2D communication, or, identifier information of the E-RAB(s) performing D2D communication and identifier information of the corresponding paired UE.

In particular implementation, the handover request may further include information on channel quality of a D2D link between the UE and the paired UE, for reference by the target base station.

In this embodiment, the resource information of the UE and the paired UE in the response of the handover request may include: information on locations of time and frequency resources of a discovery signal of the UE, and information on locations of time and frequency resources of a discovery signal of the paired UE.

In particular implementation, the response of the handover request may further include: indication information on whether the UE proceeding with communication in the target base station is permitted to perform D2D communication, or, indication information on whether the E-RAB proceeding with communication in the target base station is permitted to perform D2D communication.

For example, whether D2D communication is performed may be indicated by bit information, "1" denoting D2D communication is performed, and "0" denoting D2D communication is not performed. However, the present application is not limited thereto, and particular indication information may be determined according to an actual situation.

It can be seen from the above embodiment that a handover request for handing over UE is transmitted by a source base station, the handover request including information indicating the UE to perform D2D communication with paired UE, the UE is handed over to a target base station by the source base station according to a response of the handover request including resource information of the UE and the paired UE transmitted by the target base station, and the UE and paired UE are made to proceed with performing D2D communication in the target base station, thereby further saving signaling overhead, and reducing waste of resources.

Embodiment 3

An embodiment of the present application provides a base station, which is a source base station performing handover. This embodiment corresponds to the method of handover of Embodiment 1, with identical contents being not going to be described any further.

Figure 6:
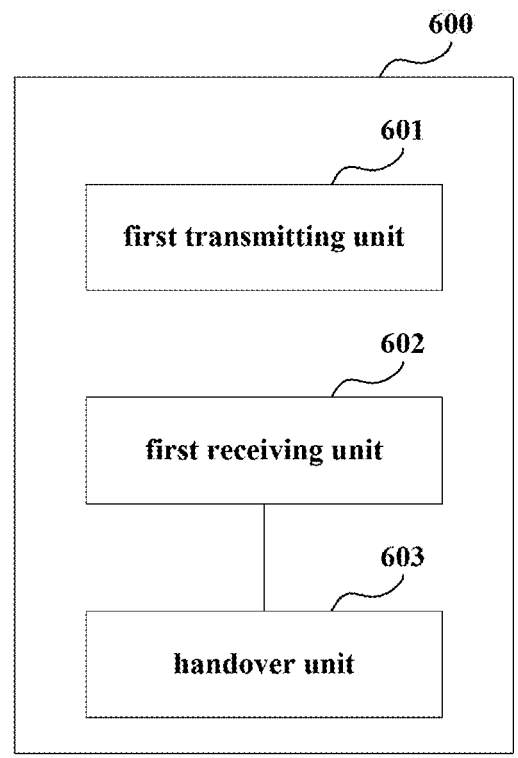
FIG. 6 is a schematic diagram of the structure of the base station of Embodiment 3 of the present application.

FIG. 6 is a schematic diagram of the structure of the base station of the embodiment of the present application. As shown in FIG. 6, the base station 600 includes: a first transmitting unit 601, a first receiving unit 602 and a handover unit 603. The relevant art may be referred to for other parts of the base station 600.

Wherein, the first transmitting unit 601 is configured to transmit a handover request for handing over UE, the handover request including information indicating the UE to perform D2D communication with paired UE; the first receiving unit 602 is configured to receive a response of the handover request transmitted by one or more base stations, and select one of the base stations as a target base station; and the handover unit 603 is configured to configure the UE and perform a handover procedure according to the response of the handover request including resource information of the UE and the paired UE transmitted by the target base station, such that the UE and the paired UE proceed with performing D2D communication in the target base station.

It can be seen from the above embodiment that a handover request for handing over UE is transmitted by a source base station, the handover request including information indicating the UE to perform D2D communication with paired UE, the UE is handed over to a target base station by the source base station according to a response of the handover request including resource information of the UE and the paired UE transmitted by the target base station, and the UE and paired UE are made to proceed with performing D2D communication in the target base station, thereby further saving signaling overhead, and reducing waste of resources.

Embodiment 4

An embodiment of the present application provides a base station, which is a target base station performing handover. This embodiment corresponds to the method of handover of Embodiment 2, with identical contents being not going to be described any further.

Figure 7:
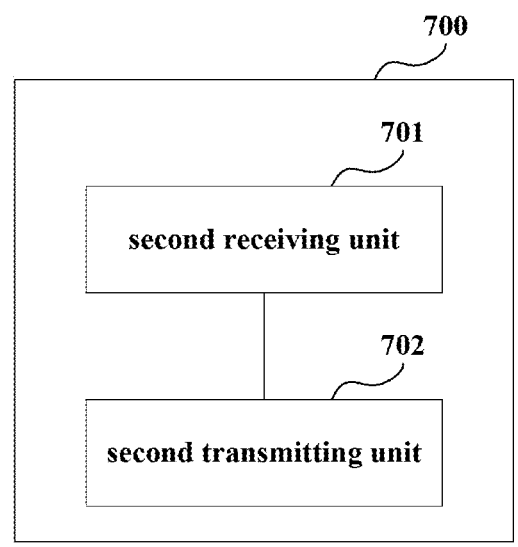
FIG. 7 is a schematic diagram of the structure of the base station of Embodiment 4 of the present application.

FIG. 7 is a schematic diagram of the structure of the base station of the embodiment of the present application. As shown in FIG. 7, the base station 700 includes: a second receiving unit 701 and a second transmitting unit 702. The relevant art may be referred to for other parts of the base station 700.

Wherein, the second receiving unit 701 is configured to receive a handover request transmitted by a source base station, the handover request including information indicating the UE to perform D2D communication with paired UE, and the second transmitting unit 702 is configured to transmit a response of the handover request to the source base station, the response of the handover request including resource information of the UE and the paired UE, such that the UE and the paired UE proceed with performing D2D communication in the target base station.

Figure 8:
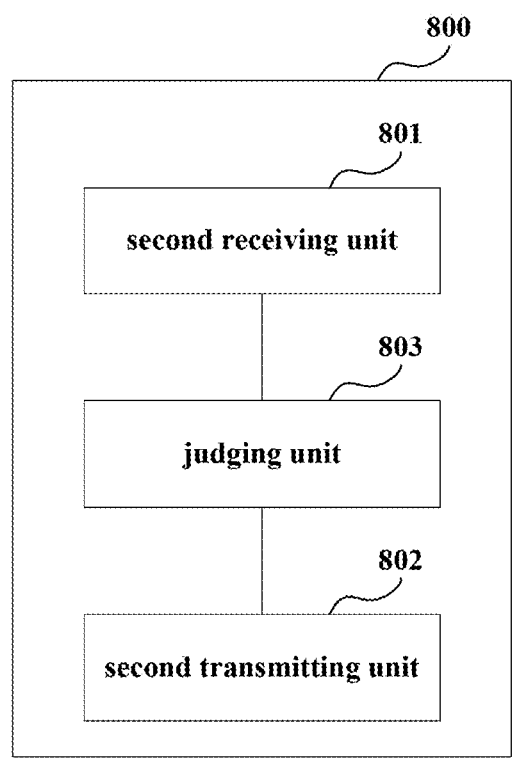
FIG. 8 is another schematic diagram of the structure of the base station of Embodiment 4 of the present application.

FIG. 8 is another schematic diagram of the structure of the base station of the embodiment of the present application. As shown in FIG. 8, the base station 800 includes a second receiving unit 801 and a second transmitting unit 802, as described above.

As shown in FIG. 8, the base station 800 may further include a judging unit 803; the judging unit 803 is configured to judge whether to permit to hand over the UE and the paired UE; and the second transmitting unit 802 is further configured to transmit the response of the handover request to the source base station when a result of judgment of the judging unit 803 is yes.

It can be seen from the above embodiment that a handover request for handing over UE is transmitted by a source base station, the handover request including information indicating the UE to perform D2D communication with paired UE, the UE is handed over to a target base station by the source base station according to a response of the handover request including resource information of the UE and the paired UE transmitted by the target base station, and the UE and paired UE are made to proceed with performing D2D communication in the target base station, thereby further saving signaling overhead, and reducing waste of resources.

Embodiment 5

An embodiment of the present application provides a method of handover in D2D communication, which shall be described from a point of view of a communication system, with contents identical to those described in embodiments 1 and 2 being not going to be described any further.

Figure 9:
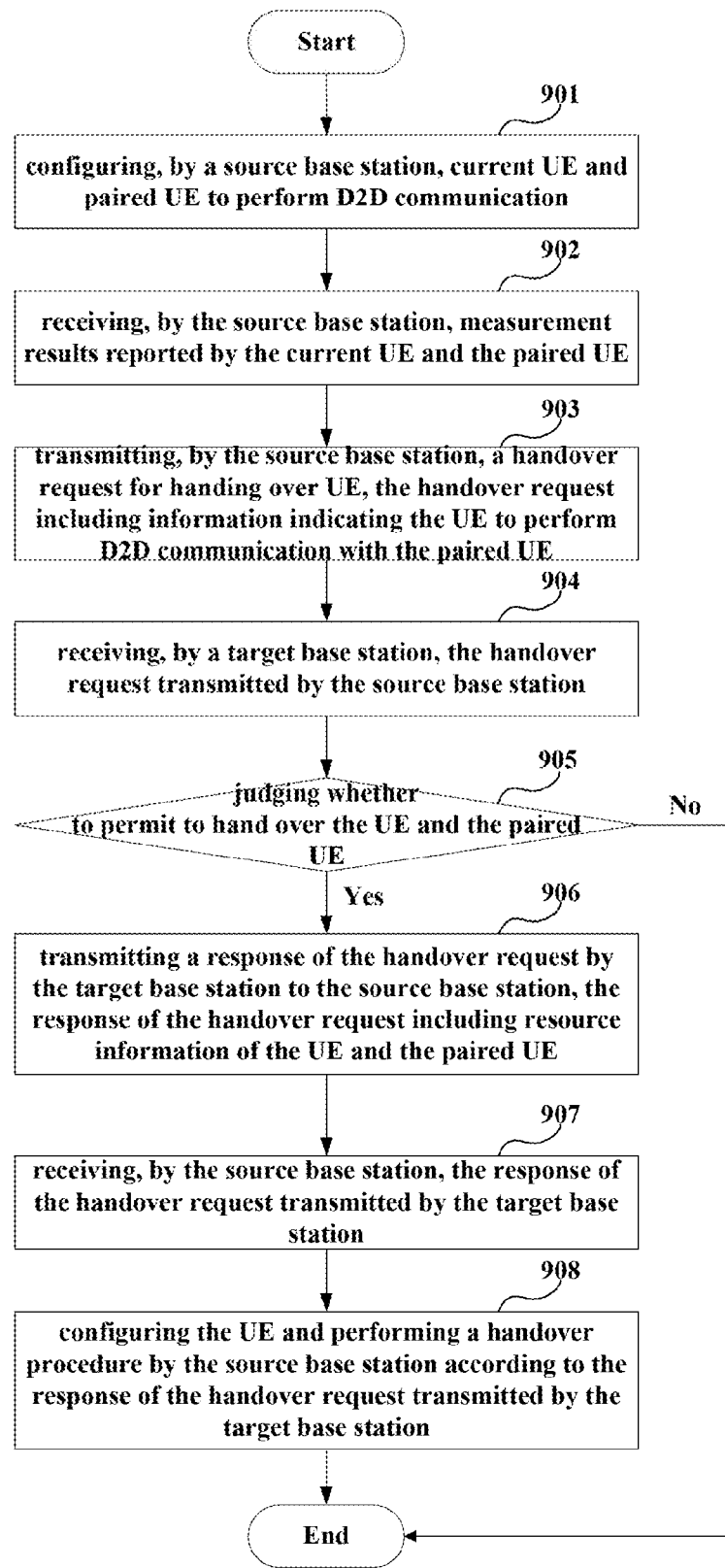
FIG. 9 is a flowchart of the method of handover of Embodiment 5 of the present application.

FIG. 9 is a flowchart of the method of handover of the embodiment of the present application. As shown in FIG. 9, the method of handover includes:

step 901: configuring, by a source base station, current UE and paired UE to perform D2D communication;

step 902: receiving, by the source base station, measurement results reported by the current UE and the paired UE;

step 903: transmitting, by the source base station, a handover request for handing over UE, the handover request including information indicating the UE to perform D2D communication with the paired UE;

step 904: receiving, by a target base station, the handover request transmitted by the source base station;

step 905: judging, by the target base station, whether to permit to hand over the UE and the paired UE, executing step 906 if yes, otherwise, terminating the process;

step 906: transmitting a response of the handover request by the target base station to the source base station, the response of the handover request including resource information of the UE and the paired UE;

step 907: receiving, by the source base station, the response of the handover request transmitted by the target base station; and step 908: configuring the UE and performing a handover procedure by the source base station according to the response of the handover request transmitted by the target base station, such that the UE and the paired UE proceed with performing D2D communication in the target base station.

An embodiment of the present application further provides a communication system, including the source base station as described in Embodiment 3 and the target base station as described in Embodiment 4.

An embodiment of the present application further provides a computer-readable program, wherein when the program is executed in a base station, the program enables a computer to carry out the method of handover as described in Embodiment 1 or 2 in the base station.

An embodiment of the present application further provides a storage medium in which a computer-readable program is stored, wherein the computer-readable program enables a computer to carry out the method of handover as described in Embodiment 1 or 2 in a base station.

The above apparatus and method of the present application may be implemented by hardware, or by hardware in combination with software. The present application relates to such a computer-readable program that when the program is executed by a logic device, the logic device is enabled to carry out the apparatus or components as described above, or to carry out the methods or steps as described above. The present application also relates to a storage medium for storing the above program, such as a hard disk, a floppy disk, a CD, a DVD, and a flash memory, etc.

One or more functional blocks and/or one or more combinations of the functional blocks in FIGS. 13-20 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present application is described above with reference to particular embodiments. However, it should be understood by those skilled in the art that such a description is illustrative only, and not intended to limit the protection scope of the present application. Various variants and modifications may be made by those skilled in the art according to the spirits and principle of the present application, and such variants and modifications fall within the scope of the present application.

What is claimed is:

1. A base station, comprising:
a first transmitting unit configured to transmit a handover request for handing over UE from the base station to a target base station, the handover request comprising information indicating UE to perform D2D communication with paired UE;
a first receiving unit configured to receive a response of the handover request transmitted by one or more base stations, and select one of the base stations as the target base station; and
a handover unit configured to configure the UE and perform a handover procedure according to the response of the handover request comprising resource information of the UE and the paired UE transmitted by the target base station, such that the UE and the paired UE proceed with performing D2D communication in the target base station,
wherein the information indicating the UE to perform D2D communication with paired UE comprises at least one of:
identifier information of the paired UE;
information indicating whether the UE to perform D2D communication and said identifier information of the paired UE;
information on whether one or more E-RABs of the UE performs D2D communication and identifier information of the paired UE corresponding to the one or more E-RABs performing D2D communication; and
information of the one or more E-RABs performing D2D communication and identifier information of the corresponding paired UE,
wherein the resource information of the UE and the paired UE in the response of the handover request comprises:
information on locations of time and frequency resources of a discovery signal of the UE, and information on locations of time and frequency resources of a discovery signal of the paired UE.

2. The base station according to claim 1, wherein the response of the handover request further comprises:
indication information on whether to permit the UE proceeding with communication in the target base station to perform D2D communication; or
indication information on whether to permit the E-RAB(s) proceeding with communication in the target base station to perform D2D communication.

3. The base station according to claim 1, wherein the handover request further comprises:
information on channel quality of a D2D link between the UE and the paired UE.

4. A base station, comprising:
a second receiving unit configured to receive a handover request transmitted by a source base station, the handover request comprising information indicating UE to perform D2D communication with paired UE; and
a second transmitting unit configured to transmit a response of the handover request to the source base station, the response of the handover request comprising resource information of the UE and the paired UE, such that the UE and the paired UE proceed with performing D2D communication in a target base station,
wherein the information indicating the UE to perform D2D communication with paired UE comprises at least one of:
identifier information of the paired UE;
information indicating whether the UE to perform D2D communication and said identifier information of the paired UE;

information on whether one or more E-RABs of the UE performs D2D communication and identifier information of the paired UE corresponding to the E-RABs performing D2D communication; and information of the E-RABs performing D2D communication and identifier information of the corresponding paired UE, wherein the resource information of the UE and the paired UE in the response of the handover request comprises:

information on locations of time and frequency resources of a discovery signal of the UE, and information on locations of time and frequency resources of a discovery signal of the paired UE.

5. The base station according to claim 4, wherein the base station further comprises:

a judging unit configured to judge whether to permit to hand over the UE and the paired UE;

and the second transmitting unit is further configured to transmit the response of the handover request to the source base station when a result of judgment of the judging unit is yes.

6. The base station according to claim 4, wherein the response of the handover request further comprises:

indication information on whether to permit the UE proceeding with communication in the target base station to perform D2D communication; or indication information on whether to permit the E-RAB proceeding with communication in the target base station to perform D2D communication.

7. The base station according to claim 4, wherein the handover request further comprises:

information on channel quality of a D2D link between the UE and the paired UE.

8. A communication system, comprising:

a base station comprising:

a first transmitting unit configured to transmit a handover request for handing over UE from the base station to a target base station, the handover request comprising information indicating UE to perform D2D communication with paired UE;

a first receiving unit configured to receive a response of the handover request transmitted by one or more base stations, and select one of the base stations as the target base station; and a handover unit configured to configure the UE and perform a handover procedure according to the response of the handover request comprising resource information of the UE and the paired UE transmitted by the target base station, such that the UE and the paired UE proceed with performing D2D communication in the target base station; and another base station comprising:

a second receiving unit configured to receive a handover request transmitted by a source base station, the handover request comprising information indicating UE to perform D2D communication with paired UE; and a second transmitting unit configured to transmit a response of the handover request to the source base station, the response of the handover request comprising resource information of the UE and the paired UE, such that the UE and the paired UE proceed with performing D2D communication in the target base station, wherein the information indicating the UE to perform D2D communication with paired UE comprises at least one of:

identifier information of the paired UE;

information indicating whether the UE to perform D2D communication and identifier information of the paired UE;

information on whether one or more E-RABs of the UE performs D2D communication and identifier information of the paired UE corresponding to the E-RABs performing D2D communication; and information of the E-RABs performing D2D communication and identifier information of the corresponding paired UE, wherein the resource information of the UE and the paired UE in the response of the handover request comprises:

information on locations of time and frequency resources of a discovery signal of the UE, and information on locations of time and frequency resources of a discovery signal of the paired UE.

9. The communication system according to claim 8, wherein the other base station further comprises:

a judging unit configured to judge whether to permit to hand over the UE and the paired UE; and the second transmitting unit is further configured to transmit the response of the handover request to the source base station when a result of judgment of the judging unit is yes.

* * * * *